(12) United States Patent
Dion

(10) Patent No.: US 6,505,728 B1
(45) Date of Patent: Jan. 14, 2003

(54) LUMBER TRANSFER SYSTEM

(75) Inventor: Gérald Dion, Roberval (CA)

(73) Assignee: Gemofor Inc., Normandin (CA)

( * ) Notice: Subject to any disclaimer, the term of this patent is extended or adjusted under 35 U.S.C. 154(b) by 0 days.

(21) Appl. No.: 09/536,081

(22) Filed: Mar. 24, 2000

(51) Int. Cl.[7] ............................................. B65G 47/10
(52) U.S. Cl. .................. 198/370.08; 198/447; 198/367
(58) Field of Search ........................ 198/370.08, 346.2, 198/447, 367, 534

(56) References Cited

U.S. PATENT DOCUMENTS

| | | | | |
|---|---|---|---|---|
| 2,338,148 A | * | 1/1944 | Walker | 198/26 |
| 3,235,101 A | * | 2/1966 | Milhaupt | 214/11 |
| 3,703,951 A | * | 11/1972 | Brockmuller | 198/20 T |
| 3,844,401 A | * | 10/1974 | Gerlovich | 198/41 |
| 4,057,138 A | * | 11/1977 | Grebe | 198/480 |
| 4,230,219 A | * | 10/1980 | Pezzin et al. | 198/481 |
| 4,378,665 A | * | 4/1983 | Crankshaw | 53/69 |
| 4,604,851 A | * | 8/1986 | Reist | 53/430 |
| 4,627,215 A | * | 12/1986 | Walz | 53/246 |
| 4,659,281 A | * | 4/1987 | Aupperle | 414/787 |
| 4,880,098 A | * | 11/1989 | Kronseder | 198/346.2 |
| 4,883,161 A | * | 11/1989 | Focke | 198/347 |
| 5,018,336 A | * | 5/1991 | Mengotti et al. | 53/435 |
| 5,052,542 A | * | 10/1991 | Wipf | 198/372 |
| 5,383,761 A | * | 1/1995 | Fluck | 414/798.9 |
| 5,630,496 A | * | 5/1997 | Mims | 198/374 |
| 6,105,751 A | * | 8/2000 | Jentjens et al. | 198/435 |
| 6,109,421 A | * | 8/2000 | Ross et al. | 198/457.07 |

* cited by examiner

Primary Examiner—Christopher P. Ellis
Assistant Examiner—Rashmi Sharma
(74) Attorney, Agent, or Firm—Ware, Fressola, Van Der Sluys & Adolphson (57) ABSTRACT

A lumber transfer system for transferring lumber pieces conveyed on a main conveyor to an upper conveyor is provided by the present invention. The lumber transfer system comprises a pivotable loading ramp movable between a loading position to direct the lumber pieces from the lower conveyor toward the upper conveyor and a standby position where the ramp is set out of the way of the lumber pieces conveyed on the main conveyor. The lumber transfer system further comprises a controllable pushing mechanism for engaging and pushing a lumber piece conveyed on the main conveyor onto and along the ramp when the ramp is in the loading position until the lumber piece reaches the loading end of the upper conveyor. The lumber transfer system further has a controller to control and synchronise the pushing mechanism and the movement of the loading ramp. A lumber transfer system for transferring lumber pieces conveyed on an upper conveyor to a lower conveyor is also provided by the present invention, as well as a quality control station embodying both of the above-mentioned lumber transfer systems.

18 Claims, 9 Drawing Sheets

PRIOR ART

LUMBER TRANSFER SYSTEM

FIELD OF THE INVENTION

The present invention generally relates to a lumber transfer system. More particularly, it concerns a lumber transfer system for transferring lumber pieces from a lower conveyor to an upper conveyor, or from the upper conveyor to the lower conveyor. The present invention also relates to a quality control station for lumber pieces including the above-mentioned transfer system, which is useful in wood planning mills.

BACKGROUND

The use of lumber transfer systems in a quality control station is already known in the prior art. These lumber transfer systems are generally used to transfer the lumber pieces conveyed on a main conveyor onto an upper conveyor on which the quality control of the board may take place. Lumber transfer systems are also used to transfer the lumber pieces from the upper conveyor back to the main conveyor.

Figure 1:
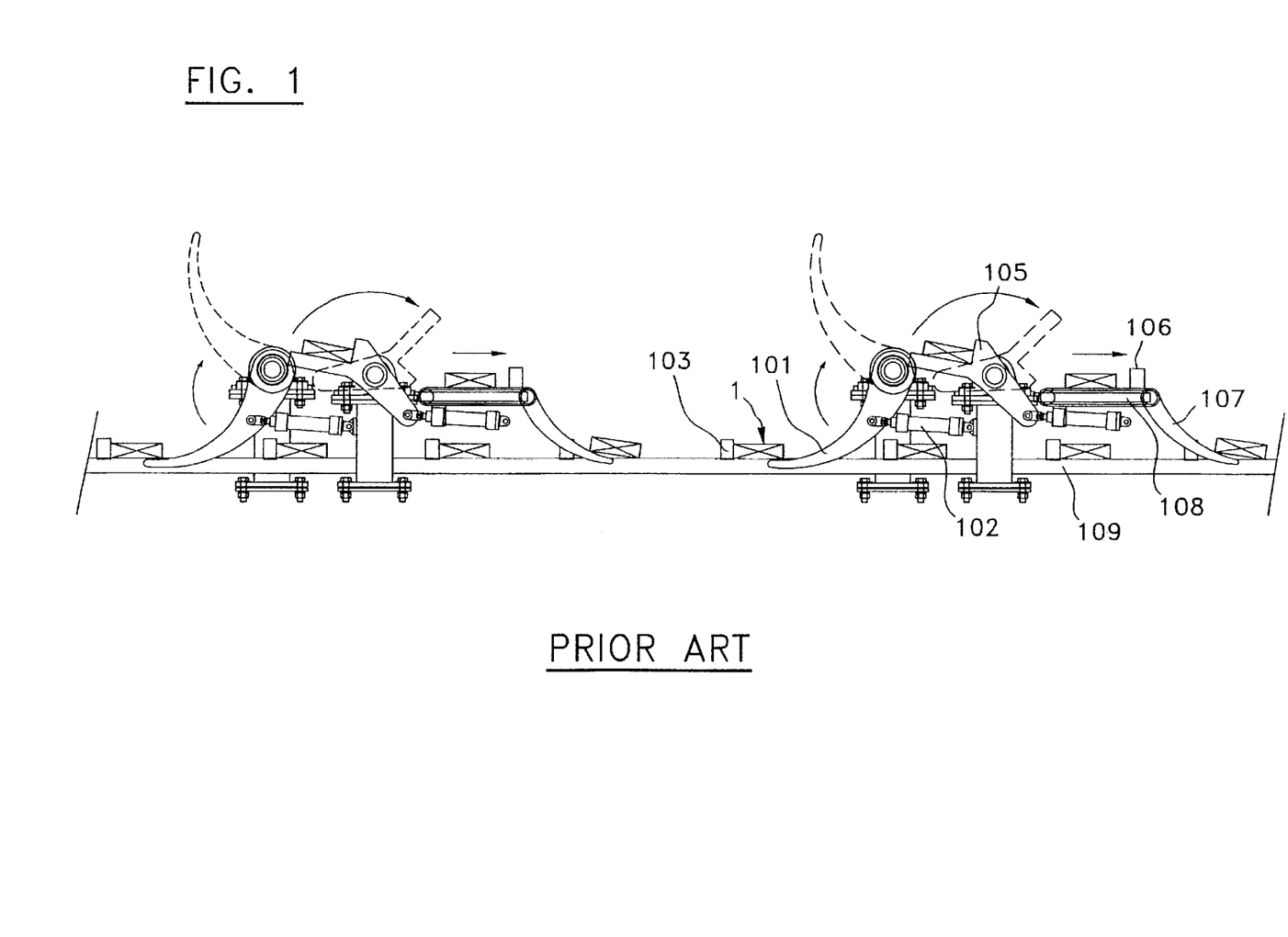
FIG. 1 is a longitudinal cross-sectional view of a prior art quality control station.

Different quality control stations using lumber transfer system exist in the field for the purpose of classifying lumber pieces. One known type of quality control station is shown in FIG. 1. This station is mounted above a main conveyor (109) and has a pivoting ramp (101) which engages a lumber piece (1) conveyed on the main conveyor (109) and lifts it up until it slides off to a turning piece assembly (105). The turning piece assembly (105) flips the lumber piece (1) upside down onto a short conveyor (108) disposed beside the turning piece assembly (105) and above the main conveyor (109). The short conveyor (108) has lugs (106) for carrying a lumber piece (1) transversally. At the end of the short conveyor (108), the lumber piece (1) slides onto an exit ramp (107) and returns to the main conveyor (109). A quality control person is positioned in front of the station, and evaluates one side of the lumber piece (1) when it lies on the turning piece assembly (105) and the other side of the lumber piece (1) when it lies on the short conveyor (108) so as to classify the lumber piece (1) into its appropriate category of quality.

Figure 2:
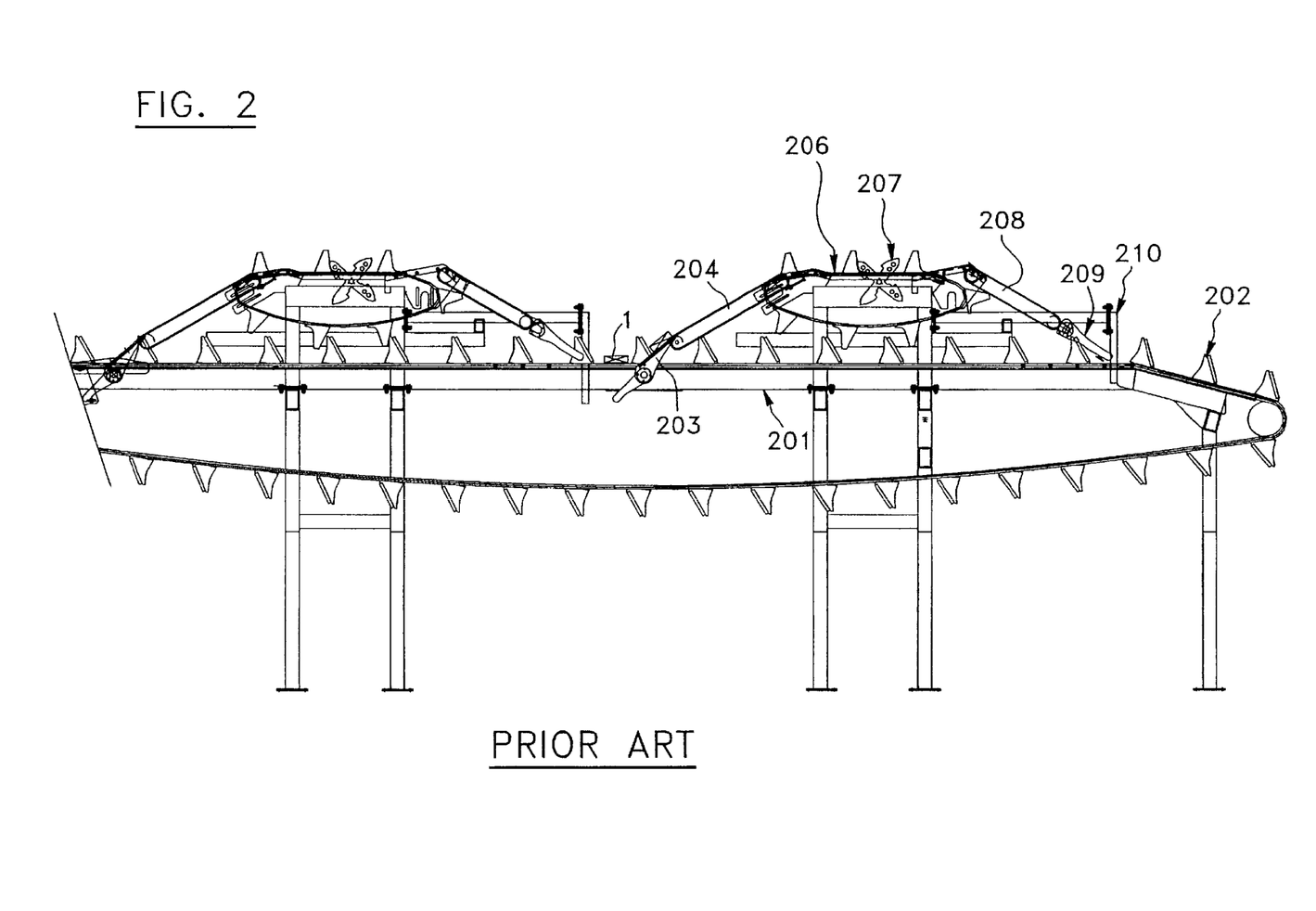
FIG. 2 is a longitudinal cross-sectional view of another prior art quality control station.
Figure 3:
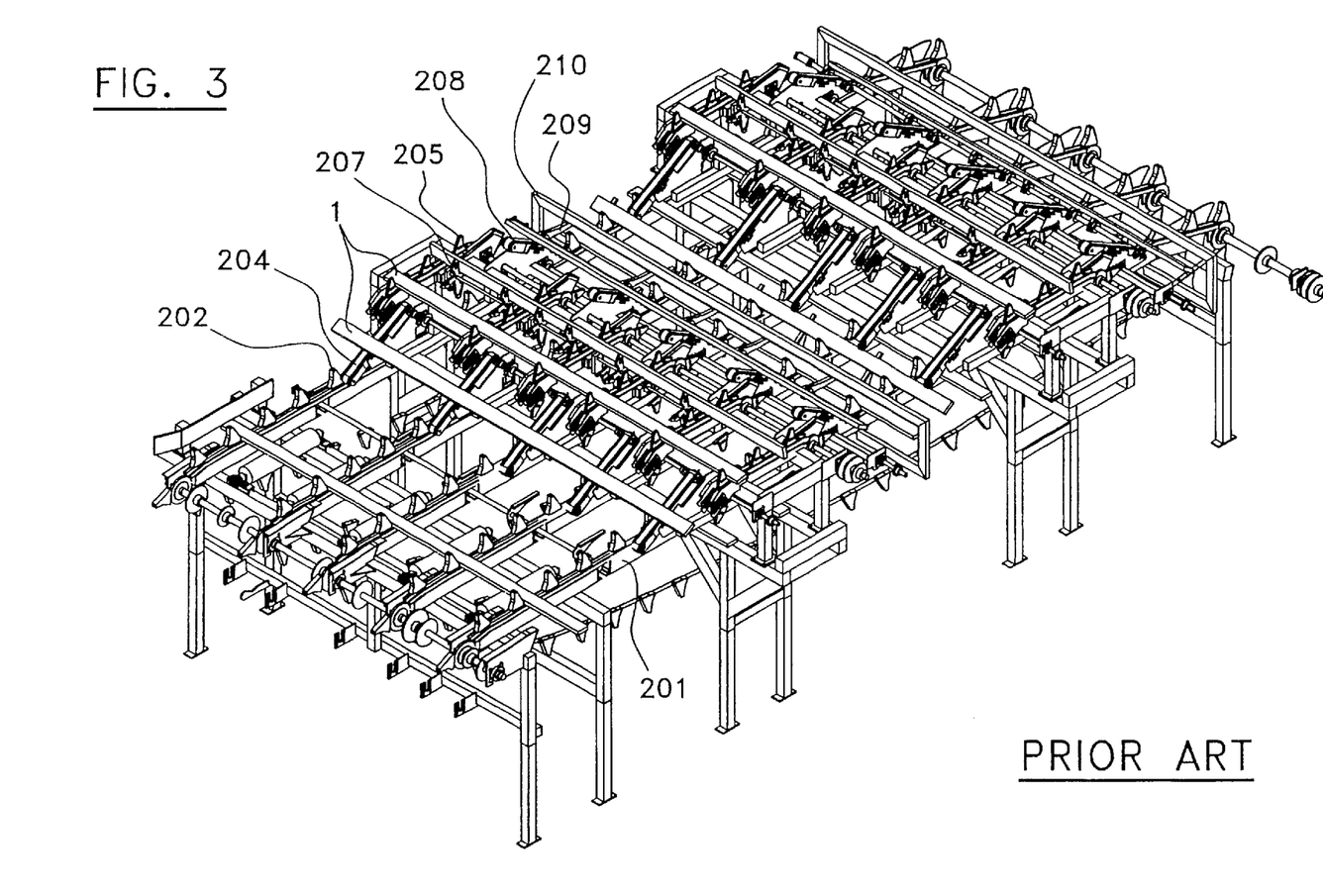
FIG. 3 is a perspective view of the prior art quality control station shown in FIG. 2.

Another type of quality control station is shown in FIGS. 2 and 3. This station is mounted above a main conveyor (201) and has a set of aligned pivotable ramps (203) which are pivoted up timely to direct a lumber piece (1) conveyed onto the main conveyor (201) toward a belt strap (204) oriented upwardly to bring the lumber piece (1) to an upper conveyor (206). Aligned lugs (202) of the main conveyor (201) push the lumber piece (1) onto the pivotable ramps (203), which direct it upwardly on the belt strap (204). Turning piece assemblies (207) are mounted onto the short conveyor (206) and turn the lumber piece (1) which is conveyed on the short conveyor (206), upside down. Another belt strap (208) disposed at the end of the short conveyor (206) receives the lumber piece (1) and carries it downwards to another set of pivotable ramps (209) which direct the lumber piece (1) to the main conveyor (201).

A drawback of the quality control station shown in FIGS. 2 and 3 lies in the belt straps (204) at the entry, since one end of a lumber piece (1) can slide back and therefore, the piece (1) would enter obliquely on the short conveyor (206), and jam the station.

SUMMARY OF THE INVENTION

An object of the present invention is to propose a lumber transfer system designed to reduce the possibilities of misalignment of the lumber pieces during their transfer from either the main conveyor to the upper conveyor or from the upper conveyor back to the main conveyor.

In accordance with the present invention, that object is achieved with a first lumber transfer system for transferring lumber pieces conveyed on a lower conveyor to an upper conveyor disposed above the lower conveyor, the lumber pieces being conveyed transversally with reference to their length, the lumber transfer system comprising:

a controllable loading ramp having a receiving end and an exit end and being movable therebetween:
        i) a loading position to direct the lumber pieces from the lower conveyor toward the upper conveyor and where the receiving end is set to receive the lumber pieces from the lower conveyor and the exit end is set to transfer said lumber pieces to a loading end of the upper conveyor; and
        ii) a standby position where the ramp is set out of the way of the lumber pieces conveyed on the lower conveyor;
    a controllable pushing means for engaging and pushing a lumber piece conveyed on the lower conveyor onto and along the ramp when the ramp is in the loading position until the lumber reaches the loading end of the upper conveyor; and
    a controlling means for controlling and synchronizing the pushing means and the movement of the loading ramp.

Preferably, the controllable pushing means comprises at least one wheel mounted on a rotating shaft extending transversally above the lower conveyor, the wheel extending in a plane parallel to the lower and upper conveyors and including at least one arm projecting radially therefrom to engage and push a lumber piece onto and along the loading ramp; and
    driving means for driving the shaft into rotation; and wherein the controlling means further control the driving means.

The invention is also directed to a second lumber transfer system for transferring lumber pieces conveyed on an upper conveyor to a lower conveyor disposed below the upper conveyor, the lumber pieces being conveyed transversally with reference to their length, the lumber transfer system comprising:

a sliding ramp to guide a lumber piece leaving an unloading end of the upper conveyor toward the lower conveyor, the sliding ramp having a receiving end in communication with the unloading end of the upper conveyor to receive the lumber piece coming from the upper conveyor and an exit end settable to deliver the lumber piece on the lower conveyor; and
    a controllable supporting means for controlling the fall of a lumber piece sliding by gravity along the sliding ramp until it reaches the lower conveyor; and
    a controlling means for controlling the supporting means.

Preferably, the controllable supporting means comprises at least one wheel mounted on a rotating shaft extending transversally above the lower conveyor, the wheel extending in a plane parallel to the upper and lower conveyors and including at least one arm projecting radially therefrom to support a lumber piece sliding on the sliding ramp; and
    driving means for driving the shaft into rotation; and wherein the controlling means for controlling the supporting means further control the driving means.

The present invention further proposes a quality control station for lumber pieces conveyed in parallel on a main conveyor and transversally with reference to their length; the quality control station comprising:

a first upper conveyor disposed above the main conveyor and having a loading end and an unloading end, a first turning means mounted on the first upper conveyor for turning upside down a lumber piece conveyed thereon;

a second upper conveyor disposed above the main conveyor downstream from the first upper conveyor; the second upper conveyor having a loading end and an unloading end, a second turning means mounted on the second upper conveyor for turning upside down a lumber piece conveyed thereon;

a first lumber transfer system as defined above for transferring the lumber pieces conveyed on the main conveyor to the first upper conveyor;

a second lumber transfer system as defined above for transferring the lumber pieces conveyed on the second upper conveyor back to the main conveyor; and a third lumber transfer system for transferring lumber pieces conveyed on the first upper conveyor back to the main conveyor and also for transferring lumber pieces conveyed on the main conveyor to the second upper conveyor.

As it can be appreciated, the present invention provides a better control of the lumber pieces transferred from a conveyor to an other conveyor located above or below. More specifically, thanks to the pushing means or the supporting means, the risk of misalignment of the lumber pieces being transferred is greatly reduced.

The invention and its advantages will be better understood upon reading the non-restrictive description of a preferred embodiment of the present invention. This description is given with reference to the appended drawings.

DETAILED DESCRIPTION OF PREFERRED EMBODIMENTS OF THE INVENTION

Figure 4:
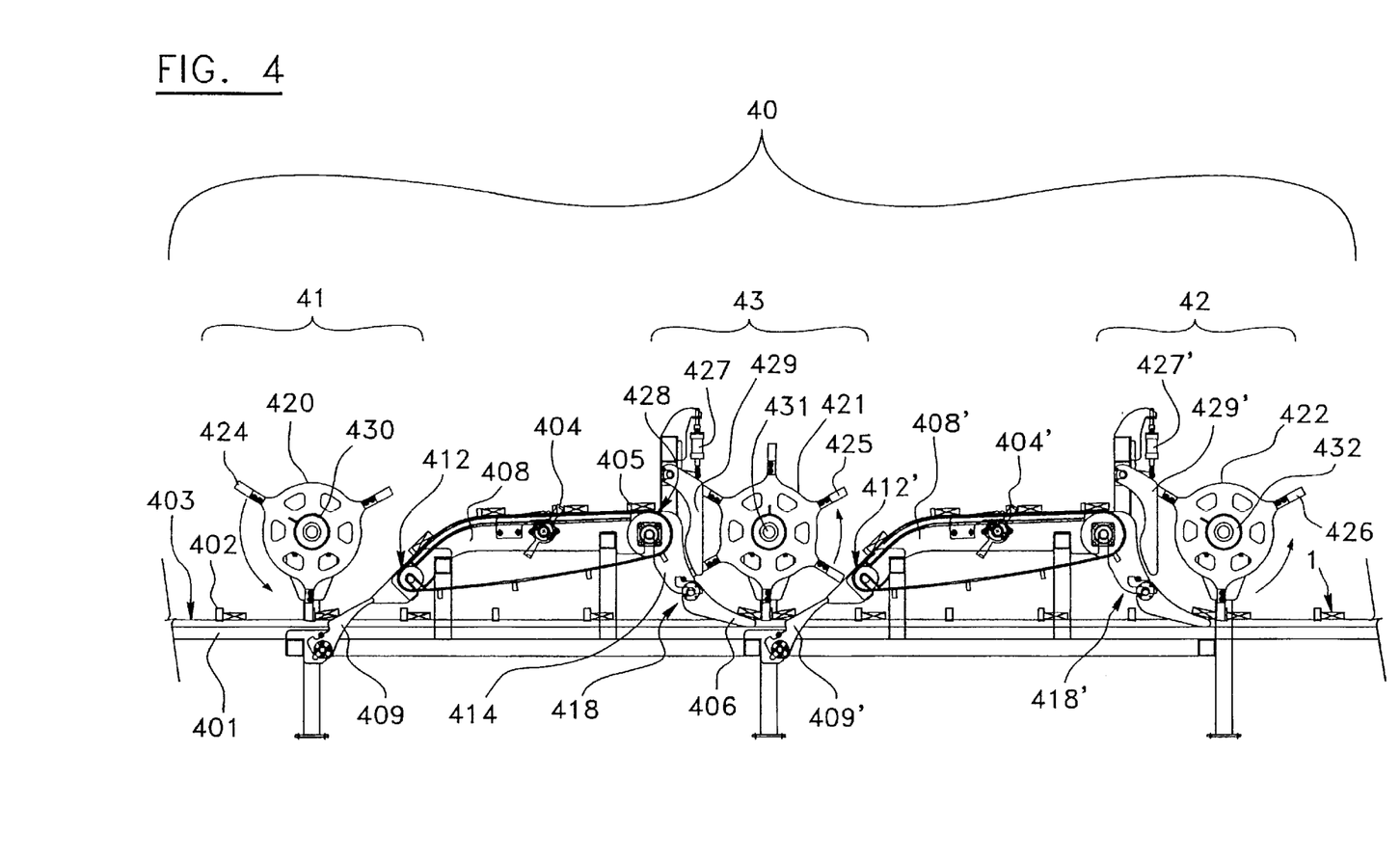
FIG. 4 is a longitudinal cross-sectional view of a quality control station embodying preferred features of the lumber transfer system according to the present invention.

Referring to FIG. 4, a quality control station (40) embodying features of the present invention is illustrated. The quality control station (40) is used to control the quality of lumber pieces (1) conveyed at fast speed on a main conveyor, such as a chain-lug conveyor comprising projecting lugs (402) to engage the lumber pieces (1). The idea is to slow down the travelling speed of the lumber pieces so that a person standing beside the conveyor be able to see and control the quality of the lumber pieces without having to slow down the speed of the main conveyor. This can be done, as in the quality control (40) illustrated, by forking the path of a lumber piece (1) conveyed on a main conveyor (401) and directing it on an upper conveyor (408) travelling at a lower speed and on which a turning means (404) is mounted. The turning means (404) is used to turn a lumber piece (1) upside down and thus to expose both sides of the lumber piece (1). This system allows a person positioned in front of the upper conveyor (408) to adequately control the quality of the lumber piece. Because of its function, in such a quality control system (40), the upper conveyor (408) is also called a classification conveyor. Once the control has been conducted, the lumber piece (1) is returned to the main conveyor (40).

For a question of productivity, the quality control station (40) shown in FIG. 4 preferably comprises two consecutive upper conveyors (408 and 408') for performing the control of the lumber pieces (1). However, it is to be understood that the quality control station (40) could have been provided with only one classification conveyor, or more than two, without departing from the scope of the present invention.

The quality control station (40) as illustrated, includes a first lumber transfer system (41) for transferring the lumber pieces (1) from the main conveyor (401) to the first upper conveyor (408) and a second lumber transfer system (42) for transferring the lumber pieces (1) from the second upper conveyor (408') back to the main conveyor (401). The quality control station (40) further comprises an in between lumber transfer system, hereinafter called the third lumber transfer system (43) for transferring lumber pieces (1) conveyed on the first upper conveyor (408) back to the main conveyor (401) and also for transferring lumber pieces (1) conveyed on the main conveyor (401) to the second upper conveyor (408').

The main conveyor (401) as illustrated, comprises lugs (402) to carry the lumber pieces (1) and prevent the same from being oblique or delayed on the conveyor (401). Similarly, the upper conveyors (408 and 408') also have lugs (405 and 405') as indicated in FIG. 4. Such conveyors are usually called lug chain conveyors.

A turning means (404 and 404') for turning a lumber piece (1) upside down is operatively mounted on each of the upper conveyors (408 and 408'). It is to be understood that the turning means (404 and 404') can be made of different shapes as soon as they are able to perform a rotation of 180° of a lumber piece (1) about its length. For example, the turning means (404) can have the shape of the one shown in FIGS. 4 and 5 or the shape of the turning piece assembly (207) of the prior art quality control station shown in FIG. 2.

The present invention is based on a lumber transfer system (41, 42 and 43) for lifting up and/or lowering lumber pieces (1) that can be useful in several applications, such as in a quality control station (40) as above-mentioned.

We will first describe in detail the first lumber transfer system (41), then the third lumber transfer system (43) and we will finish with the description of the second lumber transfer system (42).

Description of the First Lumber Transfer System (41)

As mentioned above, the first lumber transfer system (41) according to the invention is used to transfer lumber pieces (1) conveyed on the main conveyor (401) to the first upper conveyor (408) disposed above the main conveyor (401). The lumber pieces (1) which are engaged by the lugs (402) of the main conveyor (401) are conveyed transversally with reference to their length.

Figure 6A:
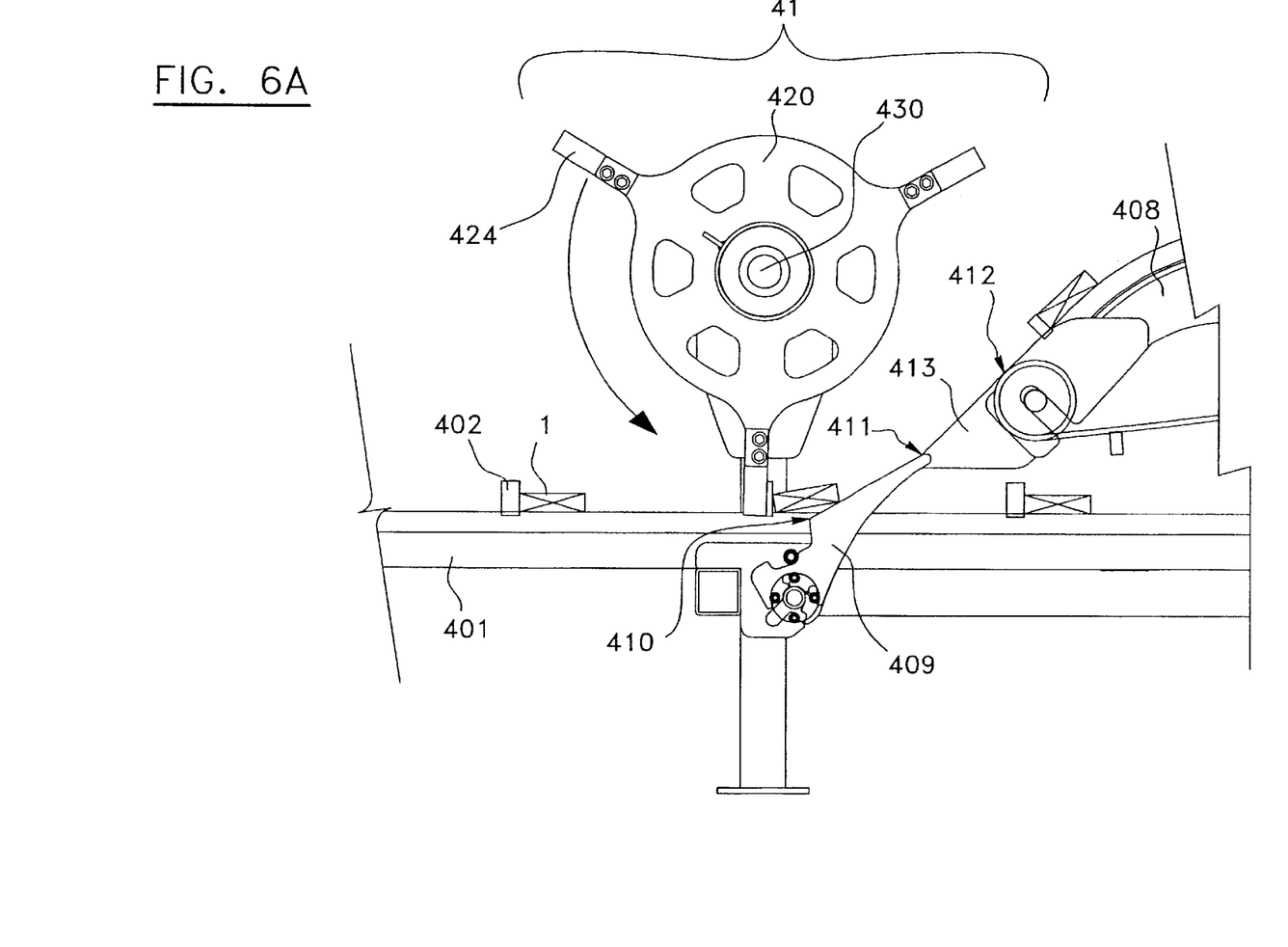
FIG. 6A shows a portion of the view of FIG. 4, where the lumber transfer system is used to transfer lumber pieces from the lower conveyor to the upper conveyor.
Figure 6B:
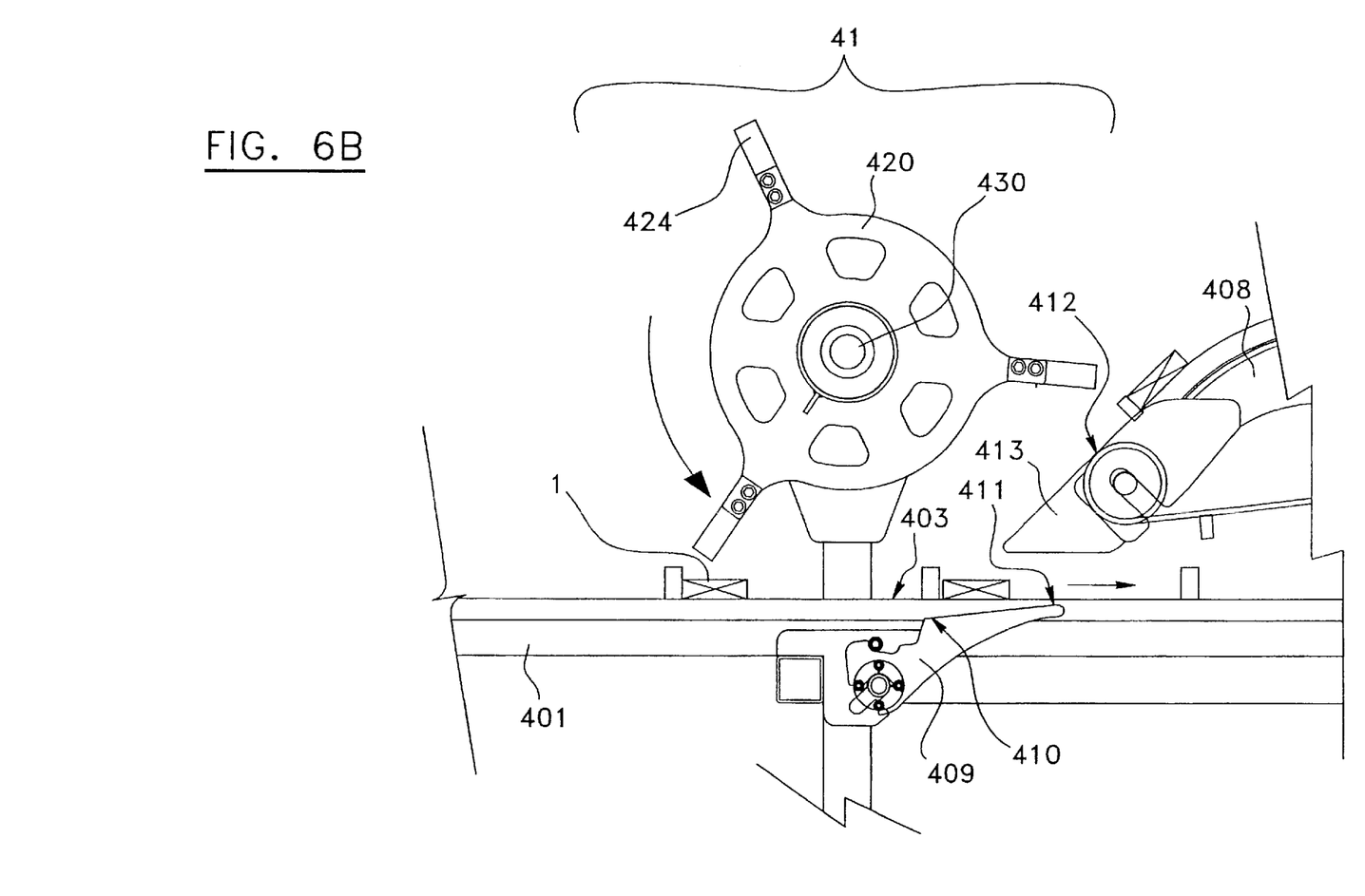
FIG. 6B is similar to FIG. 6A except that the loading ramp is in the standby position.

Referring to FIGS. 4, 6A and 6B, the first lumber transfer system (41) comprises a controllable loading ramp (409) having a receiving end (410) and an exit end (411). The receiving end (410) of the loading ramp (409) is preferably mounted next to the main conveyor (401), and the exit end (411) of the loading ramp (409) is free.

Referring more particularly to FIGS. 6A and 6B, the loading ramp (409) is pivotable between a loading position to direct the lumber pieces (1) from the main conveyor (401) toward the upper conveyor (408), as shown in FIG. 6A, and a standby position, as shown in FIG. 6B. In the loading position, the receiving end (410) of the loading ramp (409) is set to receive the lumber pieces (1) from the main conveyor (401) and the exit end (411) is set to transfer the lumber pieces (1) to a loading end (412) of the first upper conveyor (408). Referring to FIG. 6A, the loading end (412) of the first upper conveyor (408) preferably has a fixed member (413) on which the lumber piece (1) slides as-it is pushed by the pushing means which will be described below.

As best seen in FIG. 6B, in the standby position, the loading ramp (409) is set out of the way of the lumber pieces (1) conveyed on the main conveyor (401). More specifically, in that standby position, the exit end (411) is positioned below the conveying surface (403) of the main conveyor (401), as shown in FIG. 6B.

A controllable actuator (not illustrated), such as a pneumatic actuator known in the art, actuates the loading ramp and controls its movement.

A controllable pushing means is provided for engaging and pushing a lumber piece (1) conveyed on the main conveyor (401) onto and along the ramp (409) when the ramp (409) is in the loading position until the lumber piece (1) reaches the loading end.(412) of the upper conveyor (408).

Figure 5:
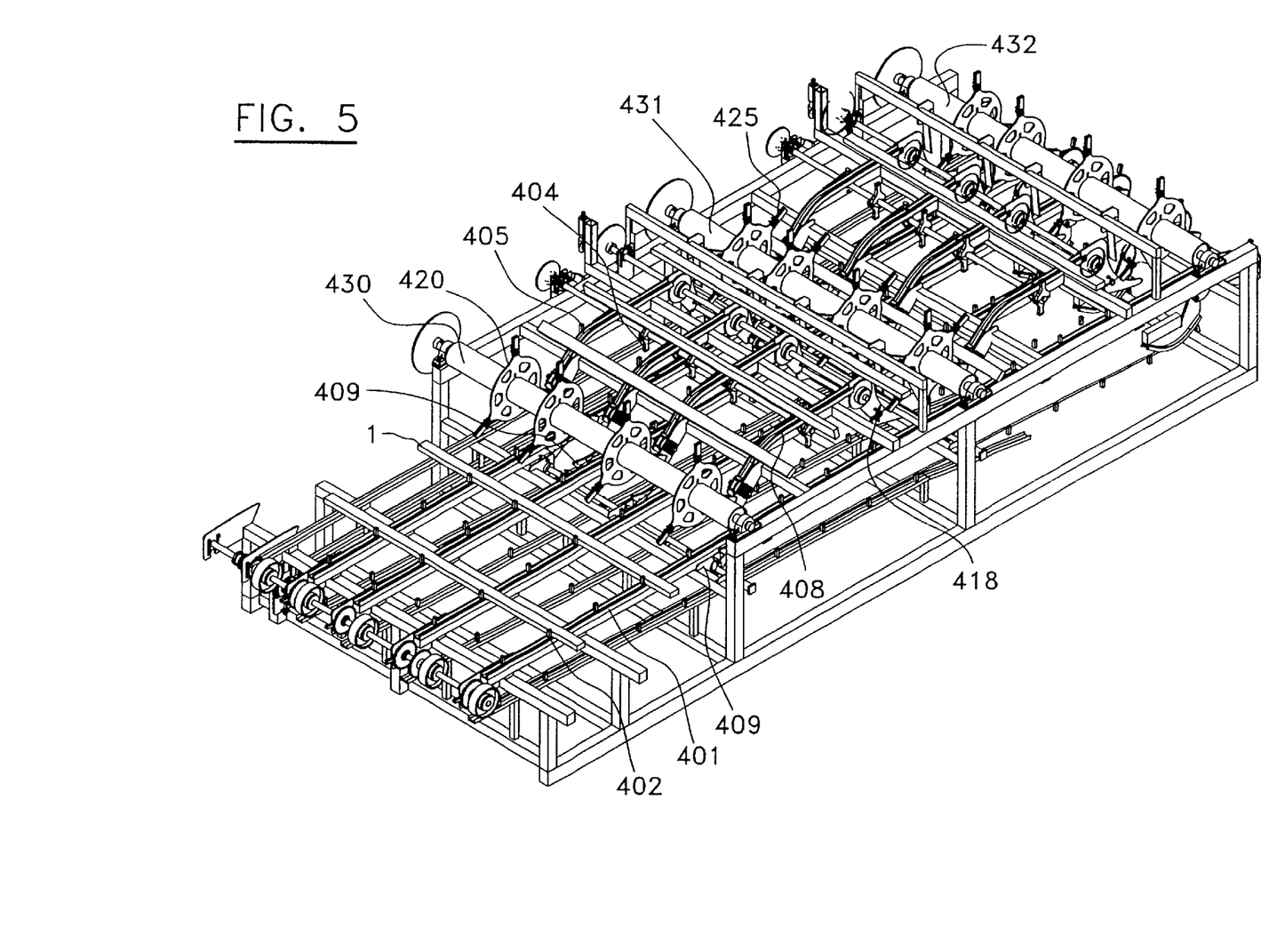
FIG. 5 is a perspective view of the quality control station shown in FIG. 4.

According to a preferred embodiment shown in FIGS. 4 and 5, the pushing means comprise a plurality of wheels (420) mounted on a first rotating shaft (430) which extends transversally above the main conveyor (401). Each of the wheels (420) extends in a plane parallel to the main conveyor (401) and the first upper conveyor (408), and includes at least one arm (424) projecting radially therefrom to engage and push a lumber piece (1) onto and along the loading ramp (409) until it reaches the loading end (412) of the first conveyor (408). Preferably, each of the wheels (420) comprises three of those arms (424) evenly distributed around the wheel (420). As illustrated, each arm (424) of a wheel (420) is in an aligned relationship with an arm (424) of each of the other wheels (420).

Also preferably, one loading ramp (409) as above described, is associated with each of those wheels (420).

Although, it is preferable to have several wheels (420) with aligned arms (424) for engaging together a lumber piece (1) and pushing it transversally, one arm (424) can be sufficient for that purpose. Indeed such single arm could have a wide extremity that would push the lumber piece (1) transversally without rendering it oblique. It is to be understood that the pushing means are not restricted to the at least one wheel (420) having at least one arm (424) projecting therefrom. The pushing means can also be embodied by an arm mounted directly on the rotating shaft (430) and having an appropriate extremity to engage and push a lumber piece (1) transversally on the loading ramp (409).

Although not shown, the lumber transfer system (41) also comprises a controlling means for controlling and synchronizing the pushing means and the movement of the loading ramp (409). Preferably, the controlling means further control the driving means that drive the rotating shaft (430).

Description of the Third Lumber Transfer System (43)

As mentioned above the third lumber transfer system (43) is disposed between the unloading end (428) of the first upper conveyor (408) and the loading end (412') of the second upper conveyor (408'). It is used to transfer lumber pieces (1) conveyed on the first upper conveyor (408) back to the main conveyor (401) and also for transferring lumber pieces (1) conveyed on the main conveyor (401) to the second upper conveyor (408').

Figure 7A:
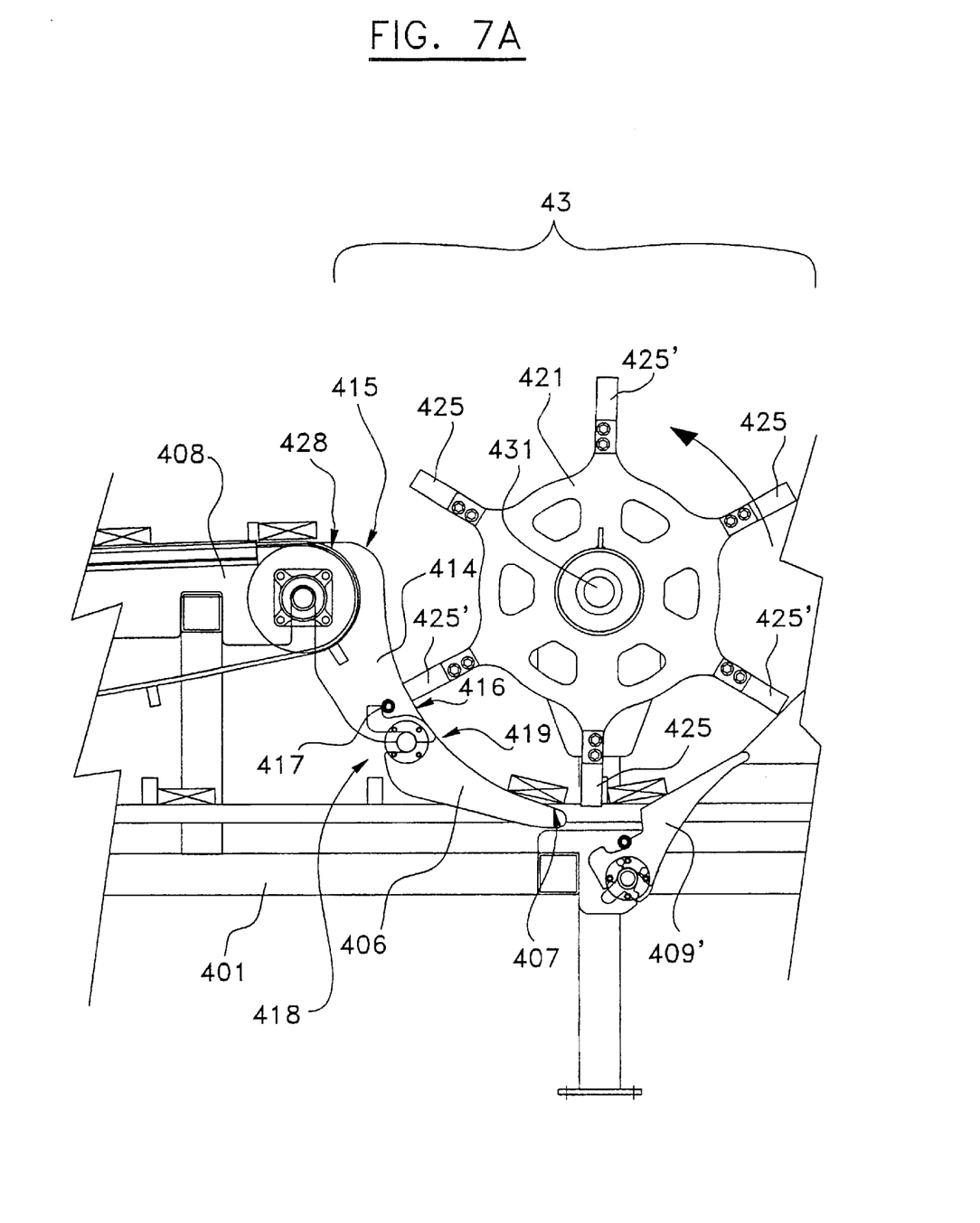
FIG. 7A shows another portion of the view of FIG. 4, where the lumber transfer system is used to transfer lumber pieces from the upper conveyor to the lower conveyor.
Figure 7B:
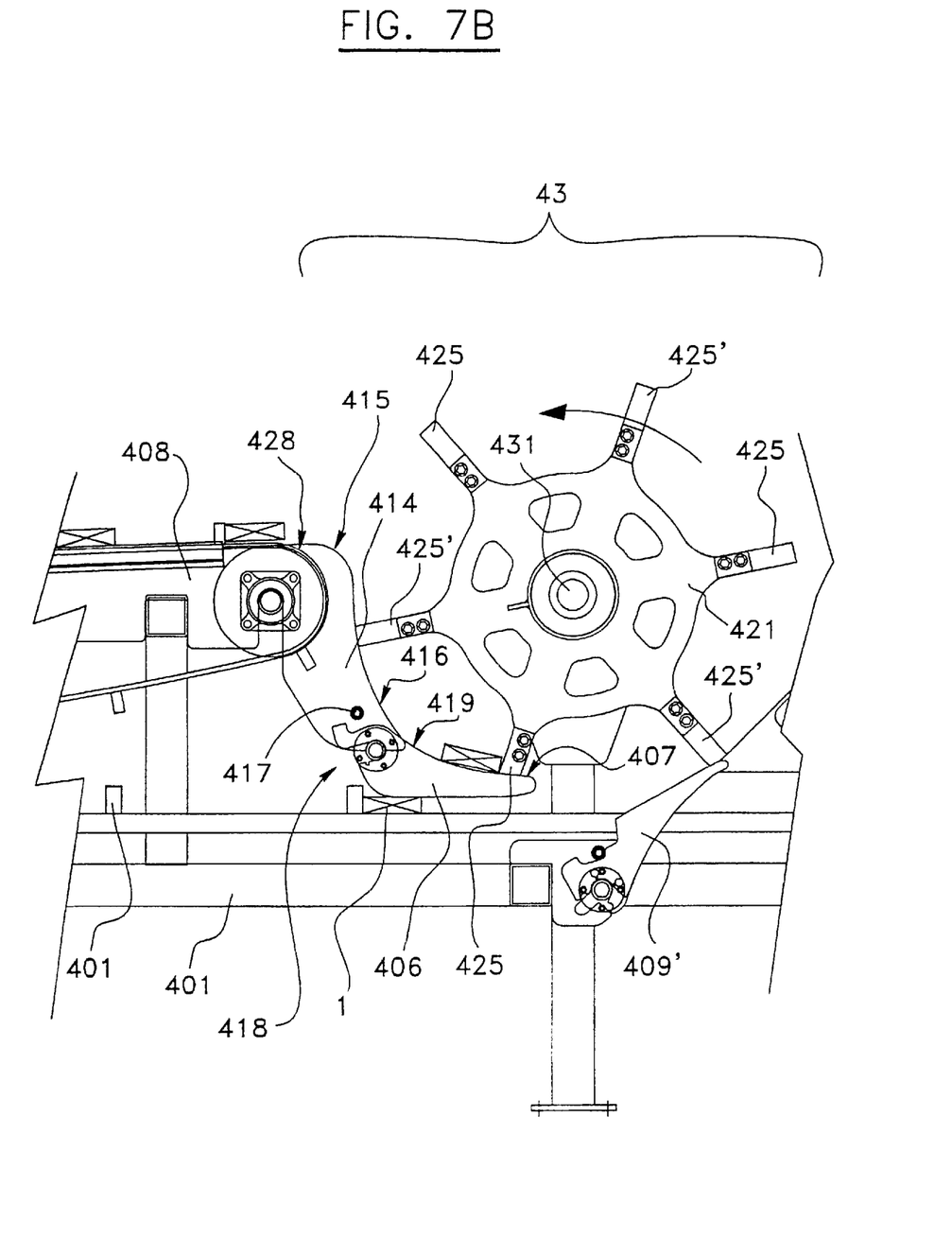
FIG. 7B is similar to FIG. 7A except that the sliding ramp is in an upwards position where it is not set to deliver a lumber piece to the lower conveyor.

Referring more particularly to FIGS. 7A and 7B, the third lumber transfer system (43) comprises a sliding ramp (418) to guide a lumber piece (1) leaving an unloading end (428) of the first upper conveyor (408) toward the main conveyor (401). The sliding ramp (418) has a receiving end (415) in communication with the unloading end (428) of the first upper conveyor (408) to receive the lumber piece (1) coming from the first upper conveyor (408) and an exit end (407) settable to deliver the lumber piece (1) on the main conveyor (401).

Still referring to FIGS. 7A and 7B, the sliding ramp (418) preferably consists of an articulated sliding ramp (418) which comprises a fix upper member (414) including, as an upper end (415), the receiving end (415) of the sliding ramp (418), and a lower end (416). In this case the sliding ramp (418) further comprises a pivotable lower member (406) which comprises an upper end (419) pivotally connected to the lower end (416) of the fix upper member (414) and a free lower end (407) which consists of the exit end (407) of the sliding ramp (418).

As can be appreciated, the lower member (406) is pivotable between a downwards position, shown in FIG. 7A, where the free lower end (407) is disposed downwards and set to deliver the lumber piece (1) on the main conveyor (401), and an upwards position, as shown in FIG. 7B. Still referring to FIG. 7A and 7B, the sliding ramp (418) preferably further comprises a stopper (417) to prevent the lower member (406) from pivoting further below the downwards position, as shown in FIG. 7A. The lower member.(406) is caused to pivot in the upwards position, as shown in FIG. 7B, when a lumber piece (1) conveyed on the main conveyor (401) passes under the sliding ramp (418), and engages and pushes upwardly the exit end (407).

The third lumber transfer system (43) further comprises a pivotable loading ramp (409') similar to the loading ramp (409) of the first lumber transfer system (42) described above, except that, in this case, the loading ramp (409') is used to direct the lumber pieces (1) from the main conveyor (401) toward the second upper conveyor (408').

Referring to FIGS. 4 and 5, the third lumber transfer system (43) further comprises at least one wheel (421) mounted on a rotating shaft (431) extending transversally above the main conveyor (401) between the unloading end (428) of the first upper conveyor (408) and the loading end (412') of the second upper conveyor (408'). The wheel (421) extends in a plane parallel to the main conveyor (401) and to the first and second upper conveyors (408 and 408') and includes three arms (425) projecting radially therefrom. These arms (425) which are preferably evenly distributed around the wheel are used to either support a lumber piece (1) sliding on the sliding ramp (418) or to engage and push a lumber piece (1) on the loading ramp (409') of the second upper conveyor (408').

As for the first lumber transfer system (41), the third lumber transfer system (43) preferably comprises a plurality of wheels (421), each arm (425) of one wheel (421) being in an aligned relationship with an arm of each of the other wheels (421). Preferably, one sliding ramp (418) and one loading ramp (409'), as above described, are associated with each wheel (421).

The rotation of the first shaft (430) is synchronised with the pivotal movement of the loading ramp (409) such that, in action, an arm (424) of the first lumber transfer system (41) engages and pushes one lumber piece (1) every two pieces (1), for example, on the loading ramp (409) which is moved in the loading position, as shown in FIG. 6A. Each lumber piece (1) which is not shifted up on the first upper conveyor (408) continues its way on the main conveyor (401) and passes under the first upper conveyor (408). It then pushes upwardly the free lower end (407) of the lower member (406) of the sliding ramp (418) of the third lumber transfer system (43) which can pivot freely in the upwards position, as shown in FIG. 7B. As soon as the lumber pieces move away, the lower member (406) of the sliding ramp (418) takes back its downward position by gravity or by the weight of a lumber piece (1) falling from the first upper conveyor (408). FIG. 7B shows a lumber piece (1) just falling from the first upper conveyor (408) and leaning on the pivotable lower member (406) which is still in the upward position.

Referring to FIG. 4, the third lumber transfer system (43) preferably also comprises a guide member (429) located above the unloading end (428) of the first upper conveyor (408) and extending downwardly following the fix upper member (414) of the articulated sliding ramp (418). The guide member (429) defines with the unloading end (428) of the first upper conveyor (408) and the fix upper member (414), a passageway of a constant width which is sufficient to allow a lumber piece (1) to pass by. Thus, the guide member (429) forces the lumber piece (1) to follow the surface of the unloading end (428) and the curved shape of the fix upper member (414). Preferably, the guide member (429) can pivot away from the unloading end (428) when a wide lumber piece (1) falling from the upper conveyor (408), pushes it. The guide member (429) is advantageously biased in his original position by means of a powered cylinder (427).

Referring to FIGS. 7A and 7B, each wheel (421) preferably has three arms (425') intercalate between the arms (425). These six arms (425 and 425') are evenly distributed around each wheel (421) of the third rotating shaft (431). The three additional arms (425') are useful to ensure that the lumber piece (1) leaning on the lower member (406) in the upwards position, as shown in FIG. 7B, will continue its sliding motion and timely reach the appropriate lugs (402) of the main conveyor (401). These three additional arms (425,) are also useful to ensure that the lumber piece (1) will not get delayed by bouncing on the guide member (429) if such a guide member (429) is used and if such bouncing happened. In other words, the additional arms (425') are used to ensure that a lumber piece (1) reaches the main conveyor (401) by pushing it if the sliding motion of the lumber piece (1) on the sliding ramp (418) is interrupted. A lumber piece (1) which is pushed by lugs (402) of the main conveyor (401) and which is directed towards the first upper conveyor (408) will be replaced in front of the same lugs (402) by a lumber piece (1) coming back from the first upper conveyor (408).

Description of the Second Lumber Transfer System (42)

Referring to FIG. 4, the second lumber transfer system (42) is used to transfer the lumber pieces (1) from the second upper conveyor (408') back to the main conveyor (401). It comprises a sliding ramp (418') similar to the sliding ramp (418) of the third lumber transfer system (43) described above. It further comprises a plurality of wheels (422) mounted on a second rotating shaft (432) extending transversally above the main conveyor (401). Each wheel (422) extends in a plane parallel to the main conveyor (401) and to the second upper conveyor (408'). It includes three arms (426) preferably evenly distributed around the wheel (422) and projecting radially therefrom to respectively support a lumber piece (1) sliding on the sliding ramp (418'). Each wheel (422) can also include three additional arms (not shown) similar to the additional arms (425') of the wheels (421) and being intercalate between the arms (426) in such a way that all the arms (426) and the additional arms (not shown) would be evenly distributed around each wheel (422). Referring to FIG. 4, the second lumber transfer system (42) preferably also comprise a guide member (429') and a powered cylinder (427') similar to the guide member (429) and powered cylinder (427) of the third lumber transfer system (43).

Obviously, driving means for driving the shafts (430, 431 and 432) of the three lumber transfer systems (41, 42, 43) into rotation are provided. Any conventional driving means known by a person skilled in the art can be used.

The station further comprises a controller. Preferably, one or more computers operatively connected to the controllable actuator of each loading ramp (409 and 409') and to the driving means of the shafts (430, 431 and 432) to control and synchronise the rotation of the shafts with the pivotal movement of the loading ramps (409, 409') and with the fall of a lumber piece (1) from the upper conveyors (408, 408')

As can be appreciated, all three lumber transfer systems (41, 42 and 43) described above are based on the same invention, since all three comprise an arm (424, 425, 426) (or other similar means) and a ramp (409, 409', 418, 418') for sliding the lumber piece (1) the ultimate goal being a better control of the movement of the lumber piece (1) being transferred from two conveyors at different levels, thereby reducing the possibility of misalignment .

Although preferred embodiments of the invention have been described in detail herein and are illustrated in the accompanying drawings, it is to be understood that the invention is not limited to these precise embodiments, and that various changes and modifications may be effected therein without departing from the scope or spirit of the invention as defined in the appended claims.

What is claimed is:

1. A lumber transfer system for transferring lumber pieces conveyed on a lower conveyor to an upper conveyor disposed above the lower conveyor, the lumber pieces being conveyed transversally with reference to their length, the lumber transfer system comprising:

a controllable loading ramp having a receiving end and an exit end and being movable therebetween:

i) a loading position to direct the lumber pieces from the lower conveyor toward the upper conveyor and where the receiving end is set to receive the lumber pieces from the lower conveyor and the exit end is set to transfer said lumber pieces to a loading end of the upper conveyor; and ii) a standby position where the ramp is set out of the way of the lumber pieces conveyed on the lower conveyor;

a controllable pushing means for engaging and pushing a lumber piece conveyed on the lower conveyor onto and along the ramp when the ramp is in the loading position until the lumber piece reaches the loading end of the upper conveyor; and a controlling means for controlling and synchronising the pushing means and the movement of the loading ramp.

2. A lumber transfer system as claimed in claim 1, wherein the pushing means comprise:

at least one wheel mounted on a rotating shaft extending transversally above the lower conveyor, the wheel extending in a plane parallel to the lower and upper conveyors and including at least one arm projecting radially therefrom to engage and push a lumber piece onto and along the loading ramp; and driving means for driving the shaft into rotation; and wherein the controlling means further control said driving means.

3. A lumber transfer system as claimed in claim 2, wherein:

the pushing means comprise a plurality of said wheels;

the at least one arm projecting radially from each wheel is in an aligned relationship to each other to engage and push the lumber piece onto and along the loading ramp; and wherein a loading ramp as defined in claim 1 is associated with each of said wheels.

4. A lumber transfer system as claimed in claim 3, wherein each of said wheels of the pushing means comprises three arms evenly distributed around the wheel.

5. A lumber transfer system as claimed in claim 1, wherein:

the receiving end of the loading ramp is pivotally mounted next to the lower conveyor and the exit end of the loading ramp is a free end;

the loading ramp is pivotable between the loading position where the exit end is in communication with the loading end of the upper conveyor, and the standby: position where the exit end is positioned below a conveying surface of the lower conveyor.

6. A combination of a lumber transfer system as claimed in claim 1 with a second lumber transfer system used to transfer the lumber pieces from the upper conveyor back to the lower conveyor.

7. A combination as claimed in claim 6, wherein the second lumber transfer system comprises:

a sliding ramp to guide a lumber piece leaving an unloading end of the upper conveyor toward the lower conveyor, the sliding ramp having a receiving end in communication with the unloading end of the upper conveyor to receive the lumber piece coming from the upper conveyor and an exit end settable to deliver the lumber piece on the lower conveyor; and a controllable supporting means for controlling the fall of a lumber piece sliding by gravity along the sliding ramp until the same reaches the lower conveyor; and a controlling means for controlling the supporting means.

8. A combination as in claim 7, wherein the supporting means comprise:

at least one wheel mounted on a rotating shaft extending transversally above the lower conveyor, the wheel extending in a plane parallel to the lower and upper conveyors and including at least one arm projecting radially therefrom to support a lumber piece sliding on the sliding ramp; and driving means for driving the shaft into rotation; and wherein the controlling means for controlling the supporting means further control said driving means.

9. A combination as claimed in claim 8, wherein:

the supporting means comprise a plurality of said wheels;

the at least one arm projecting radially from each wheel is in an aligned relationship to each other to support the lumber piece sliding on the sliding ramp; and wherein a sliding ramp as defined in claim 7 is associated with each Wheel.

10. A combination as claimed in claim 9, wherein each wheel of the supporting means comprises three of said arms evenly distributed around the wheel.

11. A combination as claimed in claim 7, wherein the sliding ramp consists of an articulated sliding ramp comprising:

a fixed upper member including, as an upper end, the receiving end of the sliding ramp, and a lower end;

a pivotable lower member comprising an upper end pivotally connected to the lower end of the fixed upper member and a free lower end which consists of the exit end of the sliding ramp, the lower member being pivotable therebetween:

i) a downwards position where the free lower end is disposed downwards and set to deliver the lumber piece onto the lower conveyor, and ii) an upwards position; and a stopper to prevent the lower member from pivoting further below the downwards position; whereby the lower member is caused to pivot in the upwards position when a lumber piece conveyed onto the lower conveyor passes under the sliding ramp, and engages and pushes the lower member upwardly.

12. A lumber transfer system for transferring lumber pieces conveyed on an upper conveyor to a lower conveyor disposed below the upper conveyor, the lumber pieces being conveyed transversally with reference to their length, the lumber transfer system comprising:

a sliding ramp to guide a lumber piece leaving an unloading end of the upper conveyor toward the lower conveyor, the sliding ramp having a receiving end in communication with the unloading end of the upper conveyor to receive the lumber piece coming from the upper conveyor and an exit end settable to deliver the lumber piece on the lower conveyor;

a controllable supporting means for controlling the fall of a lumber piece sliding by gravity along the sliding ramp until it reaches the lower conveyor; and a controlling means for controlling the supporting means, wherein the exit end is settable to deliver the lumber piece slidably onto the lower conveyor, and wherein the supporting means is configured to slidably push pieces of lumber upwardly along a second sliding ramp to a second upper conveyor.

13. A lumber transfer system as claimed in claim 12, wherein the supporting means comprise:

at least one wheel mounted on a rotating shaft extending transversally above the lower conveyor, the wheel extending in a plane parallel to the upper and lower conveyors and including at least one arm projecting radially therefrom to support a lumber piece sliding on the sliding ramp; and driving means for driving the shaft into rotation; and wherein the controlling means for controlling the supporting means further control said driving means.

14. A lumber transfer system as claimed in claim 13, wherein:

the supporting means comprise a plurality of said wheels; and the at least one arm projecting from each wheel is in an aligned relationship to each other to support the lumber piece sliding on the sliding ramp.

15. A lumber transfer system as claimed in claim 14, wherein the wheel of the supporting means comprises three arms evenly distributed around said wheel.

16. A lumber transfer system for transferring lumber pieces conveyed on an upper conveyor to a lower conveyor disposed below the upper conveyor, the lumber pieces being conveyed transversally with reference to their length, the lumber transfer system comprising:

a sliding ramp to guide a lumber piece leaving an unloading end of the upper conveyor toward the lower conveyor, the sliding ramp having a receiving end.in communication with the unloading end of the upper conveyor to receive the lumber piece coming from the upper conveyor and an exit end settable to deliver the lumber piece on the lower conveyor;

a controllable supporting means for controlling the fall of a lumber piece sliding by gravity along the sliding ramp until it reaches the lower conveyor; and a controlling means for controlling the supporting means, wherein the sliding ramp consists of an articulated sliding ramp comprising:

a fixed upper member including, as an upper end, the receiving end of the sliding ramp, and a lower end;

a pivotable lower member comprising an upper end pivotally connected to the lower end of the fixed upper member and a free lower end which consists of the exit end of the sliding ramp, the lower member being pivotable therebetween:

i) a downwards position where the free end is disposed downwards and set to deliver the lumber piece on the lower conveyor, and ii) an upwards position; and a stopper to prevent the lower member from pivoting further below the downwards position;

whereby the lower member is caused to pivot in the upwards position when a lumber piece conveyed on the lower conveyor passes under the sliding ramp, and engages and pushes the exit end upwardly.

17. The combination of lumber transfer systems of claim 6, further comprising turning means mounted on the upper conveyor, for turning upside down a lumber piece conveyed thereon.

18. The combination of lumber transfer systems of claim 17, for use as a first combination in order to transfer lumber from the lower conveyor to the upper conveyor and back to the lower conveyor, further comprising a second combination of lumber transfer systems forming a sequence with the first combination, the sequence being suitable as a lumber quality control station, wherein the first combination and the second combination share a common lumber transfer system which is the second lumber transfer system of the first combination, and wherein the common lumber transfer system is for transferring at least some lumber pieces conveyed on the upper conveyor of the first combination back to the main conveyor, and also for transferring at least some lumber pieces conveyed on the main conveyor to the second upper conveyor of the second combination.

* * * * *

UNITED STATES PATENT AND TRADEMARK OFFICE
CERTIFICATE OF CORRECTION

PATENT NO. : 6,505,728 B1  Page 1 of 1
DATED : January 14, 2003
INVENTOR(S) : Gerald Dion It is certified that error appears in the above-identified patent and that said Letters Patent is hereby corrected as shown below:

Column 5,
Line 23, after "as" "—" should be deleted.
Line 38, after "end" "." should be deleted.

Column 6,
Line 43, after "member" "." should be deleted.

Column 9,
Line 36, after "standby" ":" should be deleted.
Line 47, "and" should be -- end --.

Column 10,
Line 7, "Wheel" should be -- wheel --.

Column 11,
Line 14, after "end" "." should be deleted.

Signed and Sealed this

Twenty-seventh Day of May, 2003

JAMES E. ROGAN
*Director of the United States Patent and Trademark Office*